Patented Feb. 5, 1946

2,394,230

UNITED STATES PATENT OFFICE 2,394,230

METHODS OF PREPARING α-AMINO ACIDS AND N-SUBSTITUTED-α-AMINO ACIDS

John H. Billman, Bloomington, Ind.

No Drawing. Application September 19, 1941, Serial No. 411,555

14 Claims. (Cl. 260—531)

This invention relates to methods of preparing α-amino acids and N-substituted-α-amino acids.

Amino acids have long been recognized as essential to biological processes in most living things and more recently have been utilized to sustain life. Numerous methods have heretofore been employed for the synthesis of these amino acids and more particularly the α-amino acids. For example, some of these methods have been used which involve the amination of α-halogenated acids, the Gabriel synthesis and the Strecker synthesis. All of these methods, however, have the common disadvantage of being rather lengthy, expensive, and usually yielding small amounts of amino acids.

In accordance with this invention, α-amino acids and N-substituted-α-amino acids are prepared by a method which is efficient and economical. This method comprises protecting the amino group of β-amino alcohol containing no aliphatic unsaturated group, oxidizing the protected β-amino alcohol to the corresponding β-amino acid by converting its methylol group into a carboxyl group, and then removing the protecting group. This protection is achieved by reacting the β-amino alcohol with a compound containing a group which renders unoxidizable the amino radical of the β-amino alcohol during the oxidization of the methylol group of the alcohol to the carboxyl group. Desirably the compound which is reacted with the β-amino alcohol contains an acyl group. Examples of groups which protect the amino radical during oxidization of the β-amino alcohol are:

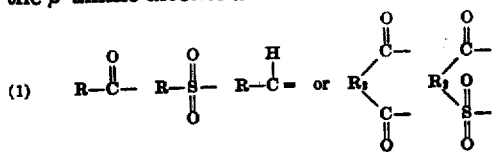

in which R is an alkyl radical or an aryl radical containing no unsaturated aliphatic substituent and containing no non-hydrocarbon oxidizable substituent, and R₂ is an alkylene, alkylidene, or arylene radical containing no unsaturated aliphatic substituent and containing no non-hydrocarbon oxidizable substituent. Examples of the radical R are the monovalent radicals derived from ethane, propane, chloroethane, benzene, chlorotoluene, nitrobenzene, chlorobenzene, naphthalene, benzoic acid, benzene sulfonic acid, diphenyl, anisole, ethyl benzoate, ethyl ether. Examples of the radical R₂ are the divalent radicals derived from ethane, propane, chloroethane, benzene, toluene, o-xylene, dinitrobenzene, chlorobenzene, naphthalene, benzoic acid, and phenetole. Examples of compounds which contain the protecting group and which when reacted with the β-amino alcohol protect the amino radical during oxidization are aliphatic or aromatic acyl halides, anhydrides, esters, carboxylic acids and salts of the acids; aliphatic or aromatic sulfonyl halides; aromatic or aliphatic aldehydes; aliphatic or aromatic dicarboxylic acid halides; aliphatic or aromatic dicarboxylic acid anhydrides; aliphatic or aromatic dicarboxylic acids and the salts of these acids; aliphatic or aromatic dicarboxylic esters; and aromatic or aliphatic sulfocarboxylic acid halides, and aromatic or aliphatic sulfocarboxylic acid anhydrides. In the event that a salt of an aliphatic or aromatic acid, or aliphatic or aromatic dicarboxylic acid is used, the β-amino alcohol employed should be a salt of the β-amino alcohol, such as the hydrochloride.

The reactions which take place in protecting the β-amino alcohol with the different groups indicated in Formula 1 may be represented by the following equations:

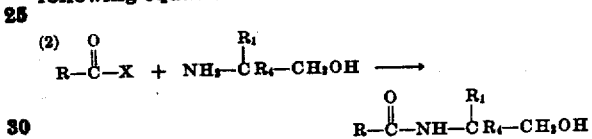

in which X is hydroxyl, aryloxy, alkyloxy, chlorine, bromine or iodine, and R₁ is hydrogen, an alkyl radical or an aryl radical containing no unsaturated aliphatic group and R₄ is hydrogen, an alkyl radical or an aryl radical containing no unsaturated aliphatic group.

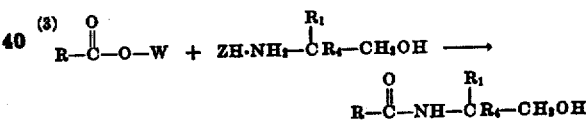

in which W is a metallic element such as sodium and Z is a negative radical such as chloride.

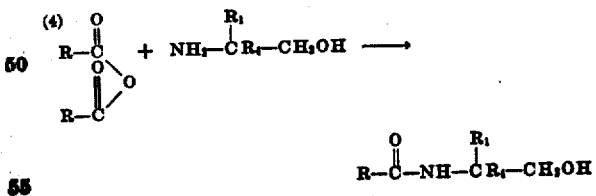

(5) 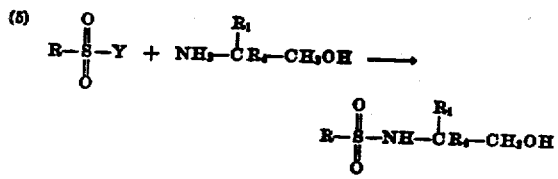

in which Y is chlorine, bromine, or iodine.

(6) 

(7) 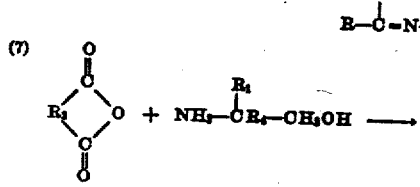

(8) 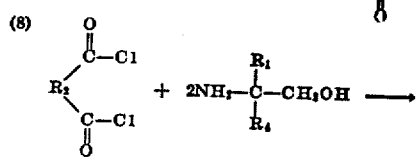

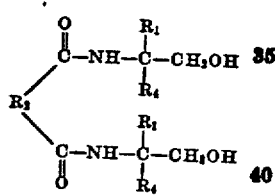

(9) 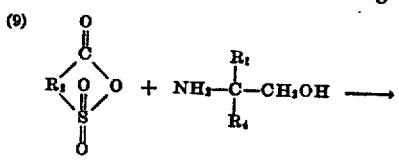

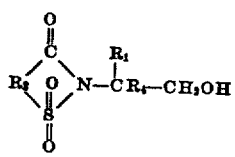

The resulting protected β-amino alcohol is then oxidized to convert the methylol group of the alcohol to a carboxyl group. This oxidation may be performed by any suitable oxidizing agent, such as: a metallic permanganate, for example an alkali-metal permanganate, an alkaline-earth metal permanganate, or zinc permanganate, in an aqueous medium of any reaction, whether alkaline, acid, or neutral; a chromic oxidizing agent, including chromic acid $CrO_3$, metallic dichromates, and metallic chromates, such as sodium dichromate, in an acid medium; an oxidizing acid, including, in addition to the chromic acid already named, persulfuric acid, chloric acid, or nitric acid; lead peroxide; or ferric chloride; all of which oxidizing agents lie between ferric chloride and persulfuric acid inclusive in the series of oxidation-reduction potentials. (For instance, see "Oxidation potentials," by Latimer, published in New York by Prentiss-Hall, Inc., in 1938, pages 293 et seq.) Alternatively, the oxidation may be performed by an electro-chemical method. Preferably the reaction is performed between 0° C. and the boiling point of the reaction mixture.

The reactions which take place may be represented by the following equations:

(10) 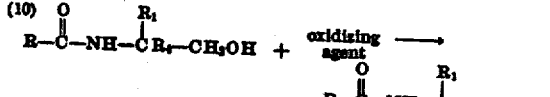

(11) 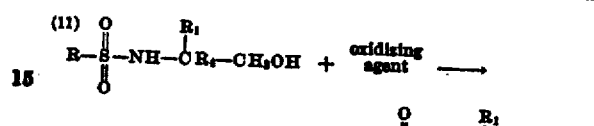

(12) 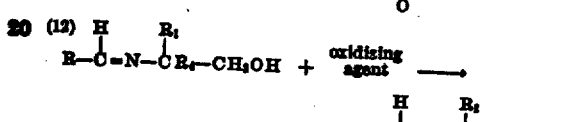

(13) 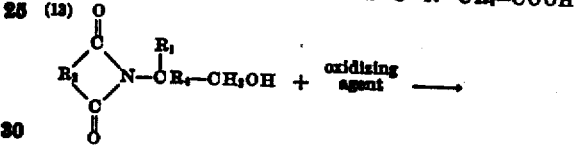

(14) 

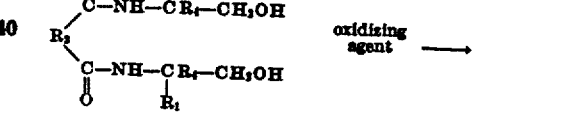

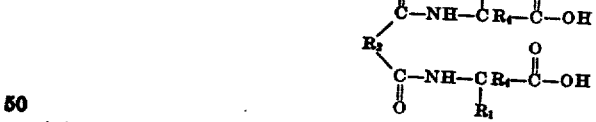

(15) 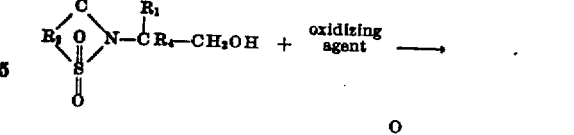

Sometimes the resulting product, instead of being an acid as indicated by Equations 10, 11, 12, 13, 14, and 15, might be a salt of the acid, such as the sodium salt. A salt is formed if the oxidation is performed in a basic medium, such as in the presence of sodium hydroxide or sodium carbonate.

After the protected β-amino alcohol has been oxidized to the corresponding acid, the resulting compound is decomposed to form an α-amino acid. This decomposition may, for example, be accomplished by hydrolyzing the resulting oxidation compound with an acid, such as hydrochloric, sulphuric, or nitric acid, or a base, such as sodium or barium hydroxide.

The overall reaction which takes place may be represented by the following equations:

(16) 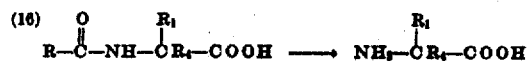

(17) 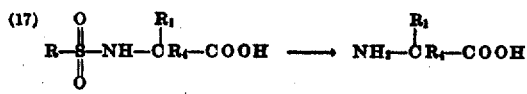

(18) 

(19) 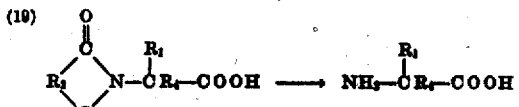

(20) 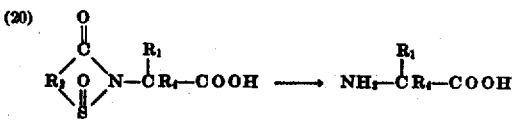

(21) 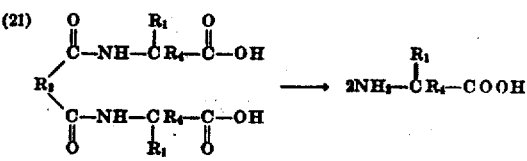

Typical examples of the method in accordance with this invention are as follows:

*Example 1.—Preparation of d-1-alanine (α-aminopropionic acid)*

Twenty grams of β-amino propyl alcohol are added to a solution containing 12 g. of sodium hydroxide and 100 cc. of water. 38 g. of benzoyl chloride are added slowly in small portions, with stirring, to this mixture. The benzoyl derivative which is N-benzoyl-β-amino propyl alcohol separates out as an oil which crystallizes on standing. It may be represented by the following formula:

(22) 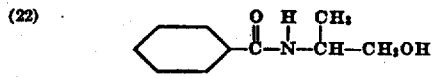

43 g. of N-benzoyl-β-amino propyl alcohol are suspended in 100 cc. of water in a flask equipped with a mechanical stirrer. 50.6 g. of potassium permanganate are added to 500 cc. of water and the solution is stirred to form a saturated solution. Some of the potassium permanganate does not dissolve. The saturated solution of potassium permanganate is then added slowly through a dropping funnel over a period of 30 minutes to the solution of N-benzoyl-β-amino propyl alcohol. The remaining potassium permanganate which is undissolved is then added in small portions as a solid to the reaction mixture. The mixture is agitated for about half an hour after all the potassium permanganate has been added. The reaction mixture is maintained at approximately room temperature. The manganese dioxide which is formed is filtered off and the filtrate is reduced in volume to about 200 cc. and acidified with dilute hydrochloric acid, such as 6N-hydrochloric acid. The N-benzoyl-α-amino proprionic acid which is formed precipitates out. A small additional quantity of the N-benzoyl-α-propionic acid may be obtained by extracting the manganese dioxide with dilute sodium hydroxide. The crude N-benzoyl-α-amino propionic acid which is isolated is refluxed with 300 cc. of 25 percent hydrochloric acid (specific gravity 1.12) for about six hours. The resulting solution is cooled and the benzoic acid which is formed is filtered off. The filtrate is evaporated to dryness and contains the hydrochloride of α-aminopropionic acid. The residue is taken up in a small amount of warm water and an excess of pyridine is added followed by ten volumes of methyl alcohol. The pyridine reacts with the hydrochloride of the α-aminopropionic acid to produce α-aminopropionic acid. The α-aminopropionic acid which is formed may be represented by the following formula:

(23) 

*Example 2.—Preparation of α-amino isobutyric acid*

Ten grams of α-amino isobutyl alcohol are added to 100 cc. of water, with stirring. 5 g. of sodium hydroxide are added to the alcohol-water mixture. 26 g. of benzoic anhydride are then placed in a reaction mixture and the mixture stirred for a period of about six hours. The solid which precipitates out and which is N-benzoyl-β-amino isobutyl alcohol, is filtered. 5 g. of N-benzoyl-β-amino isobutyl alcohol are suspended in 100 cc. of water. 15 cc. of concentrated sulfuric acid (specific gravity 1.83) are added. 12 g. of sodium dichromate are then added and the mixture heated nearly to boiling. It is then permitted to cool. A precipitate forms which is N-benzoyl-α-amino isobutyric acid. The solid material, which is filtered, is recrystallized twice from water. To 5 g. of the N-benzoyl-α-amino isobutyric acid are added 100 cc. of 20 percent hydrochloric acid and the mixture is refluxed for a period of six hours. After filtering off the benzoic acid, the filtrate is evaporated to dryness and treated with aniline and alcohol to obtain the α-amino isobutyric acid.

*Example 3.—Preparation of α-amino acetic acid*

Twenty grams of ethanolamine are benzoylated in the same manner as the β-amino propyl alcohol was benzoylated in Example 1 by employing 46 g. of benzoyl chloride. No attempt need be made to isolate the benzoyl derivative. The oxidation can be performed by adding to the reaction mixture 69.1 g. of potassium permanganate. The reaction may be maintained at a temperature of less than 10° C. during the addition of the permanganate. The solution is permitted to come up to room temperature before filtering off the manganese dioxide. The manganese dioxide is then filtered off, the filtrate evaporated to 200 cc. and then acidified with concentrated hydrochloric acid. The N-benzoyl-α-amino acetic acid is refluxed with 150 cc. of 1:1 hydrobromic acid for approximately three hours. The benzoic acid resulting from this hydrolysis is filtered off. The α-amino acetic acid hydrobromide which is formed is converted to the α-amino acetic acid by treatment with a base in the manner described in Example 1.

*Example 4.—Preparation of α-amino n-butyric acid*

Ten grams of N-benzoyl-β-amino n-butanol, prepared from β-amino butanol and benzoyl chloride by a method analogous to that used in Example 1, are placed in 150 cc. of water. 24.8 g.

of lead peroxide and 100 cc. of glacial acetic acid are then added. The solution is refluxed overnight, filtered and evaporated to a small volume. 200 cc. of 20 percent HCl are added and the solution refluxed for two hours. Upon cooling, the solid benzoic acid is removed and the filtrate evaporated nearly to dryness. By the use of pyridine and alcohol as described in Example 1, the α-amino butyric acid is isolated.

*Example 5.—Preparation of α-amino isobutyric acid*

To 13.5 g. of β-amino isobutanol dissolved in 100 cc. of ice water are added 17 g. of methyl sulfonyl chloride. The mixture, without isolating the sulfonamide, is oxidized with 32 g. of potassium permanganate. To hydrolyze the N-methylsulfonyl α-amino isobutyric acid formed, hydrochloric acid is added to the solution, after the manganese dioxide is filtered off, and the solution refluxed for 18 hours. The solution is evaporated to dryness and treated as in Example 1 to obtain the α-amino isobutyric acid.

*Example 6.—Preparation of α-amino acetic acid*

Twelve grams of ethanol amine are dissolved in 100 cc. of water containing 10 g. of sodium hydroxide. 45 g. of β-naphthalene sulfonyl chloride are added and the mixture stirred. Upon acidification with hydrochloric acid, the naphthalene sulfonamide separates out. Without further purification the amide is added to 100 cc. of water in which are dissolved 10 g. of sodium hydroxide. 33 g. of potassium permanganate are added to the mixture. Upon completion of the oxidation, the manganese dioxide is removed. The solution is then acidified to precipitate the N-naphthalene sulfonyl derivative of α-amino acetic acid. This solid is hydrolyzed with 150 cc. of 20 percent HCl for 12 hours. The mixture is filtered and evaporated to dryness. The residue is treated with alcohol and pyridine to isolate the α-amino acetic acid in the manner described in Example 1.

*Example 7.—Preparation of α-amino propionic acid*

Five grams of N-benzoyl β-amino n-propanol, prepared from benzoyl chloride and β-amino n-propanol similar to the method described in Example 1, are placed in 100 cc. of water containing 30.2 g. of ferric chloride. The mixture is stirred and heated to boiling. The solution is made basic upon completion of the reaction and filtered. The filtrate, which contains the N-benzoyl α-amino propionic acid is refluxed in the manner described in Example 1 to obtain the α-amino propionic acid.

*Example 8.—Preparation of α-amino propionic acid*

Five grams of N-benzoyl β-amino n-propanol are suspended in 100 cc. of water to which are added 2.3 g. of potassium chlorate. Two cubic centimeters of concentrated sulfuric acid (95 percent) are added and the solution boiled for four hours. 100 cc. of 6 N HCl are added and the solution refluxed six more hours, cooled and filtered. The filtrate is evaporated and treated as in Example 1 to obtain the α-amino acid.

*Example 9.—Preparation of α-amino propionic acid*

Five grams of N-benzoyl β-amino n-propanol are added to 100 cc. of water containing 12.8 g. of ammonium persulfate and 10 cc. of concentrated sulfuric acid (95 percent) and the mixture refluxed for four hours. 100 cc. of 20 percent hydrochloric acid are added and the mixture refluxed six hours. Upon cooling the solution is filtered to remove the benzoic acid, evaporated and treated to isolate the α-amino propionic acid.

*Example 10.—Preparation of α-amino propionic acid*

Five grams of N-benzoyl β-amino n-propanol are suspended in 50 cc. of water containing 5 cc. of concentrated sulfuric acid (95 percent). 4.2 g. of chromic oxide ($CrO_3$) are added and the mixture heated to boiling. The precipitate, N-benzoyl α-amino propionic acid, which forms on standing, is recrystallized from water. This benzoylated amino acid is then hydrolyzed to obtain the α-amino propionic acid.

*Example 11.—Preparation of α-amino n-butyric acid*

Ten grams of β-amino n-butanol are dissolved in 50 cc. of dry ether to which is added slowly 12 g. of isobutyryl chloride dissolved in ether and 18 g. of pyridine. The resulting isobutyryl amide is placed in 100 cc. of water to which have been added 10 g. of sodium hydroxide. The solution is oxidized with potassium permanganate at from 5°–10° C. with vigorous stirring. The manganese dioxide is removed and the filtrate acidified with 10 cc. of concentrated hydrochloric acid and refluxed for 10 hours. The solution is then evaporated down and filtered. The filtrate is evaporated to dryness and treated with pyridine and methyl alcohol to obtain the α-amino n-butyric acid.

*Example 12.—Preparation of α-amino acetic acid*

Twenty grams of ethanol amine are dissolved in 100 cc. of water containing 20 g. of sodium hydroxide. 35 g. of acetic anhydride are added. The solution is then diluted to 400 cc. and oxidized with 69 g. of potassium permanganate added in the solid form. The manganese dioxide is filtered off and the filtrate refluxed with 200 cc. of concentrated hydrochloric acid for six hours. The solution is then evaporated to dryness and treated with pyridine and methyl alcohol to obtain the α-amino acetic acid.

*Example 13.—Preparation of α-amino acetic acid*

Fifty grams of succinic anhydride are added to an Erlenmeyer flask fitted with a ground glass joint and a variable take off condenser. To this mixture are added 33 g. of technical ethanol amine. A reaction follows immediately. The solution is then heated to 150° C. and gradually raised to 172° C. on a Wood's metal bath. Reaction takes place and the water which is given off is collected and removed. 20 g. of the resulting amide are oxidized with potassium permanganate by first warming to 60° C. and then allowing the solution to stand overnight. Upon hydrolysis with 20 percent hydrochloric acid, the hydrochloride of the α-amino acetic acid is obtained.

*Example 14.—Preparation of α-amino acetic acid*

Seventy-four grams of phthalic anhydride are placed in an Erlenmeyer flask fitted with a variable take off condenser. To this mixture are added 34 g. of technical ethanol amine. A vigorous reaction ensues within half a minute. The resulting solution is heated to 140°–150° C. for four hours and then gradually raised to 175° C. The water which forms during the reaction is removed at the take off. Upon cooling the reaction mixture solidifies, is removed from the flask and washed thoroughly with water to remove excess ethanol amine. The precipitate is dried and has a melting point of 126°–127° c.

To 20 g. of the above alcohol placed in 300 cc. of water are added 22.6 g. of potassium permanganate made up in a saturated solution. Addition takes one hour during which time the solution is kept at 70°–75° C. After the addition, the solution is stirred for one half hour at 70°–75° C. The manganese dioxide is then filtered off, and the filtrate evaporated to one sixth its original volume. 20 percent hydrochloric acid is added and the precipitate removed. The precipitate is then refluxed with 20 percent hydrochloric acid to hydrolyze the substituted amino acid. After filtering off the phthalic acid the filtrate is evaporated to dryness and the solid residue treated as in Example 1 to free the amino acid.

*Example 15.—Preparation of α-amino isobutyric acid*

Twenty grams of β-amino isobutanol are added to 50 cc. of water containing 12 g. of sodium hydroxide. 24 g. of benzaldehyde are added. Heat is evolved and two layers formed. To this mixture are added 47.3 g. of potassium permanganate. Upon completion of the oxidation, the manganese dioxide is removed and the filtrate hydrolyzed with hydrochloric acid and the solution evaporated to dryness. By treatment with pyridine and alcohol, the hydrochloride of the amino acid is decomposed to liberate the amino acid.

*Example 16.—Preparation of α-amino n-butyric acid*

Ten grams of finely divided N-benzoyl β-amino n-butanol are suspended in 500 cc. of water containing 10 cc. of concentrated sulfuric acid (sp. gr. 1.83). An electric current of 1.7 amperes is passed through the solution for four hours during which time the solution is stirred vigorously. The oxygen set free at the anode oxidizes the N-benzoyl β-amino n-butanol to N-benzoyl α-amino n-butyric acid. The unreacted starting material (about 1 g.) is filtered off and the solution reduced to about 75 cc. By treatment with 20 percent hydrochloric acid the benzoyl group is removed from the N-benzoyl α-amino n-butyric acid, and the filtrate is evaporated to dryness as in Example 1, to obtain free α-amino n-butyric acid.

*Example 17.—Preparation of α-amino propionic acid*

Twenty grams of β-amino propanol are reacted with 12 g. of acetaldehyde in the presence of sodium hydroxide. To this solution are added 55 g. of potassium permanganate as in Example 15. Upon completion of the oxidation, the manganese dioxide is filtered off and the filtrate is hydrolyzed with 25 percent hydrochloric acid. The solution is then evaporated to dryness and treated with pyridine and methyl alcohol to obtain the α-amino propionic acid.

*Example 18.—Preparation of α-amino propionic acid*

Twenty grams of ethyl malonic ester

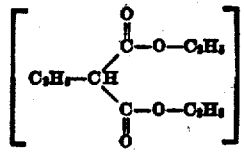

are refluxed for fifteen hours with 14.8 g. of β-amino propanol during which time the alcohol is removed as it forms. At the end of this time the solution is cooled, water is added, followed by a saturated solution containing 39 g. of calcium permanganate. The manganese dioxide which forms is removed by filtering. 20 percent hydrochloric acid is added and the solution refluxed for six hours at the end of which time the solution is evaporated to dryness under reduced pressure. Any ethyl malonic acid left is removed with ether. The residue is treated with pyridine and methyl alcohol as in Example 1 to isolate the α-amino propionic acid.

*Example 19.—Preparation of α-amino acetic acid*

Ten grams of monoethanol amine are dissolved in ether and added to an ether solution containing 8.4 g. phthalyl chloride. The precipitate which forms is filtered off and the filtrate evaporated to dryness. 100 cc. of water are added to the residue followed by a saturated solution containing 17.3 g. of potassium permanganate, which is sufficient permanganate to oxidize the two alcohol groups in each molecule. After oxidation, the solution is treated as described in Example 1 to obtain the α-amino acetic acid.

*Example 20.—Preparation of α-amino isobutyric acid*

To an ether solution of 27 g. of β-amino isobutanol is added the calculated amount of α-chloro sulfoacetyl dichloride

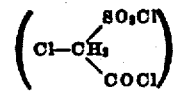

dissolved in ether. The resulting precipitate is removed and the filtrate is oxidized with 32 g. of potassium permanganate and treated as in Example 1 to obtain the α-amino isobutyric acid.

As the foregoing examples show, the β-amino alcohols and the N-acyl-β-amino alcohols used are always primary alcohols; and so by the terms "β-amino alcohol" and "N-acyl-β-amino alcohols" I mean such primary alcohols.

What is claimed is:

1. The method of producing a composition selected from the class consisting of α-amino acids and N-acyl-α-amino acids, which comprises acylating the amino group of a β-amino alcohol containing no aliphatic unsaturated group, and oxidizing the carbinol group of the resulting N-acyl-β-amino alcohol to a carboxyl group by treating said last-named alcohol with an oxidizing agent lying between ferric chloride and persulfuric acid inclusive in the series of oxidation-reduction potentials.

2. The method of producing a composition selected from the class consisting of α-amino acids and N-acyl-α-amino acids, comprising oxidizing a β-amino alcohol containing no aliphatic unsaturated group and the amino group of which is acylated by treating said alcohol with an oxidizing agent lying between ferric chloride and persulfuric acid inclusive in the series of oxidation-reduction potentials.

3. The method of producing α-amino acid, which comprises oxidizing a β-amino alcohol containing no aliphatic unsaturated group and the amino group of which is acylated by treating said alcohol with an oxidizing agent lying between ferric chloride and persulfuric acid inclusive in the series of oxidation-reduction potentials, and hydrolyzing the resulting product to form an α-amino acid.

4. The method of producing a composition selected from the class consisting of α-amino acids and N-acyl-α-amino acids, which comprises reacting a compound containing an acyl group with a β-amino alcohol to form an N-acyl-β-amino alcohol, and oxidizing the carbinol group of said last-named alcohol to a carboxyl group by treating said last-named alcohol with an oxidizing agent lying between ferric chloride and persulfuric acid inclusive in the series of oxidation-reduction potentials.

5. The method of producing α-amino acid, which comprises reacting a compound containing an acyl group with a β-amino-alcohol to form an N-acyl-β-amino alcohol, oxidizing the carbinol group of said last-named alcohol to a carboxyl group by treating said last-named alcohol with an oxidizing agent lying between ferric chloride and persulfuric acid inclusive in the series of oxidation-reduction potentials, and hydrolyzing the resulting product to form an α-amino acid.

6. In the method of producing a composition selected from the class which consists of α-amino acids and N-acyl-α-amino acids, the step of oxidizing an N-acyl-β-amino alcohol by treatment of said alcohol with an oxidizing agent lying between ferric chloride and persulfuric acid inclusive in the series of oxidation-reduction potentials.

7. The method of producing a composition selected from the class which consists of α-amino acids and N-acyl-α-amino acids, which comprises oxidizing an N-benzoyl-β-amino alcohol by treating said alcohol with an oxidizing agent lying between ferric chloride and persulfuric acid inclusive in the series of oxidation-reduction potentials.

8. The method of producing a composition selected from the class which consists of α-amino acids and N-acyl-α-amino acids, which comprises reacting a composition containing a benzoyl group with a β-amino alcohol to form an N-benzoyl-β-amino alcohol, and oxidizing said N-benzoyl-β-amino alcohol to form an N-benzoyl-α-amino acid by treating said alcohol with an oxidizing agent lying between ferric chloride and persulfuric acid inclusive in the series of oxidation-reduction potentials.

9. In the method of producing a composition selected from the class which consists of α-amino acids and N-acyl-α-amino acids, the step of oxidizing an N-acyl-β-amino alcohol by treating it with potassium permanganate.

10. In the method of producing a composition selected from the class which consists of α-amino acids and N-acyl-α-amino acids, the step of oxidizing an N-acyl-β-amino alcohol by treating it with a chromic oxidizing agent in an acid medium.

11. In the method of producing a composition selected from the class which consists of α-amino acids and N-acyl-α-amino acids, the step of oxidizing an N-acyl-β-amino alcohol by treating it with a metallic permanganate in an aqueous medium.

12. In the method of producing a composition selected from the class which consists of α-amino acids and N-acyl-α-amino acids, the step of oxidizing an N-acyl-β-amino alcohol by treating it with an oxidizing acid.

13. In the method of producing a composition selected from the class which consists of α-amino acids and N-acyl-α-amino acids, the step of oxidizing an N-acyl-β-amino alcohol by treating it with nitric acid.

14. In the method of producing a composition selected from the class which consists of α-amino acids and N-acyl-α-amino acids, the step of oxidizing an N-acyl-β-amino alcohol by treating it with an alkali-metal dichromate in acid solution.

JOHN H. BILLMAN.

Certificate of Correction

Patent No. 2,394,230.   February 5, 1946.

JOHN H. BILLMAN

It is hereby certified that errors appear in the printed specification of the above numbered patent requiring correction as follows: Page 1, first column, line 20, after "group of" insert α; line 22, after "corresponding" strike out "β" and insert instead α—; and that the said Letters Patent should be read with this correction therein that the same may conform to the record of the case in the Patent Office.

Signed and sealed this 30th day of April, A. D. 1946.

[SEAL]

LESLIE FRAZER,
*First Assistant Commissioner of Patents.* hydrolyzing the resulting product to form an α-amino acid.

4. The method of producing a composition selected from the class consisting of α-amino acids and N-acyl-α-amino acids, which comprises reacting a compound containing an acyl group with a β-amino alcohol to form an N-acyl-β-amino alcohol, and oxidizing the carbinol group of said last-named alcohol to a carboxyl group by treating said last-named alcohol with an oxidizing agent lying between ferric chloride and persulfuric acid inclusive in the series of oxidation-reduction potentials.

5. The method of producing α-amino acid, which comprises reacting a compound containing an acyl group with a β-amino-alcohol to form an N-acyl-β-amino alcohol, oxidizing the carbinol group of said last-named alcohol to a carboxyl group by treating said last-named alcohol with an oxidizing agent lying between ferric chloride and persulfuric acid inclusive in the series of oxidation-reduction potentials, and hydrolyzing the resulting product to form an α-amino acid.

6. In the method of producing a composition selected from the class which consists of α-amino acids and N-acyl-α-amino acids, the step of oxidizing an N-acyl-β-amino alcohol by treatment of said alcohol with an oxidizing agent lying between ferric chloride and persulfuric acid inclusive in the series of oxidation-reduction potentials.

7. The method of producing a composition selected from the class which consists of α-amino acids and N-acyl-α-amino acids, which comprises oxidizing an N-benzoyl-β-amino alcohol by treating said alcohol with an oxidizing agent lying between ferric chloride and persulfuric acid inclusive in the series of oxidation-reduction potentials.

8. The method of producing a composition selected from the class which consists of α-amino acids and N-acyl-α-amino acids, which comprises reacting a composition containing a benzoyl group with a β-amino alcohol to form an N-benzoyl-β-amino alcohol, and oxidizing said N-benzoyl-β-amino alcohol to form an N-benzoyl-α-amino acid by treating said alcohol with an oxidizing agent lying between ferric chloride and persulfuric acid inclusive in the series of oxidation-reduction potentials.

9. In the method of producing a composition selected from the class which consists of α-amino acids and N-acyl-α-amino acids, the step of oxidizing an N-acyl-β-amino alcohol by treating it with potassium permanganate.

10. In the method of producing a composition selected from the class which consists of α-amino acids and N-acyl-α-amino acids, the step of oxidizing an N-acyl-β-amino alcohol by treating it with a chromic oxidizing agent in an acid medium.

11. In the method of producing a composition selected from the class which consists of α-amino acids and N-acyl-α-amino acids, the step of oxidizing an N-acyl-β-amino alcohol by treating it with a metallic permanganate in an aqueous medium.

12. In the method of producing a composition selected from the class which consists of α-amino acids and N-acyl-α-amino acids, the step of oxidizing an N-acyl-β-amino alcohol by treating it with an oxidizing acid.

13. In the method of producing a composition selected from the class which consists of α-amino acids and N-acyl-α-amino acids, the step of oxidizing an N-acyl-β-amino alcohol by treating it with nitric acid.

14. In the method of producing a composition selected from the class which consists of α-amino acids and N-acyl-α-amino acids, the step of oxidizing an N-acyl-β-amino alcohol by treating it with an alkali-metal dichromate in acid solution.

JOHN H. BILLMAN.

---

Certificate of Correction

Patent No. 2,394,230. February 5, 1946.

JOHN H. BILLMAN

It is hereby certified that errors appear in the printed specification of the above numbered patent requiring correction as follows: Page 1, first column, line 20, after "group of" insert α; line 22, after "corresponding" strike out "β" and insert instead α—; and that the said Letters Patent should be read with this correction therein that the same may conform to the record of the case in the Patent Office.

Signed and sealed this 30th day of April, A. D. 1946.

[SEAL]

LESLIE FRAZER,
*First Assistant Commissioner of Patents.*